United States Patent
Bartolomé Rodrigo et al.

(10) Patent No.: US 11,696,103 B2
(45) Date of Patent: Jul. 4, 2023

(54) METHOD OF AND DEVICE FOR SERVICE DISCOVERY AND SELECTION

(71) Applicant: Telefonaktiebolaget LM Ericsson (publ), Stockholm (SE)

(72) Inventors: Maria Cruz Bartolomé Rodrigo, Madrid (ES); Joerg Aelken, Eynatten (BE); Antonio Alonso Alarcon, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 6 days.

(21) Appl. No.: 17/053,435

(22) PCT Filed: May 18, 2018

(86) PCT No.: PCT/EP2018/063216
§ 371 (c)(1),
(2) Date: Nov. 6, 2020

(87) PCT Pub. No.: WO2019/219219
PCT Pub. Date: Nov. 21, 2019

(65) Prior Publication Data
US 2021/0235244 A1    Jul. 29, 2021

(51) Int. Cl.
*H04W 4/50* (2018.01)
*H04W 8/02* (2009.01)
(Continued)

(52) U.S. Cl.
CPC .............. *H04W 4/50* (2018.02); *H04W 8/02* (2013.01); *H04W 8/18* (2013.01); *H04W 48/16* (2013.01); *H04W 60/04* (2013.01)

(58) Field of Classification Search
None
See application file for complete search history.

(56) References Cited

U.S. PATENT DOCUMENTS 8,526,940 B1 * 9/2013 Chowdhary .......... H04W 24/08
455/425
2007/0038746 A1 * 2/2007 Hu ........................ G06Q 10/06
709/224

(Continued)

OTHER PUBLICATIONS

PCT International Search Report and Written Opinion dated Jan. 30, 2019 for International Application No. PCT/EP2018/063216, 10 pages.

(Continued)

*Primary Examiner* — Marisol Figueroa
*Assistant Examiner* — Alexander J Yi
(74) *Attorney, Agent, or Firm* — Sage Patent Group

(57) ABSTRACT

A method of and a device for operating a service discovery and selection function in a telecommunications system, wherein the service discovery and selection function registers a service profile of a service provided by at least one service producer of the telecommunications system. The service profile among others includes consistency group information and proximity information. The consistency group information identifies instances of the service sharing a same state and the proximity information identifies deployment of the instances in the telecommunications system. The service discovery and selection function, from the service profile, based on service selection criteria, selects a single service instance of the service for a service consumer of the telecommunications system requesting the service, and identifies the selected service instance to the service consumer.

15 Claims, 6 Drawing Sheets

(51) Int. Cl.
*H04W 8/18* (2009.01)
*H04W 48/16* (2009.01)
*H04W 60/04* (2009.01)

(56) References Cited

U.S. PATENT DOCUMENTS

| 2007/0047714 | A1* | 3/2007 | Baniak | H04M 3/42 |
| | | | | 379/201.02 |
| 2011/0282975 | A1* | 11/2011 | Carter | H04L 67/10 |
| | | | | 709/220 |
| 2016/0205518 | A1 | 7/2016 | Patel et al. | |

OTHER PUBLICATIONS

3GPP, Technical Specification Group Services and System Aspects, "System Architecture for the 5G System", Stage 2 (Release 15), 3GPP TS 23.501 V15.0.0 (Dec. 2017), Valbonne, France, 181 pages.
3GPP, Technical Specification Group Services and System Aspects, "Procedures for the 5G System", Stage 2 (Release 15), 3GPP TS 23.502 V15.0.0 (Dec. 2017), Valbonne, France, 258 pages.

* cited by examiner

METHOD OF AND DEVICE FOR SERVICE DISCOVERY AND SELECTION

CROSS-REFERENCE TO RELATED APPLICATIONS

This application is a 35 U.S.C. § 371 national stage application for International Application No. PCT/EP2018/063216, entitled "METHOD OF AND DEVICE FOR SERVICE DISCOVERY AND SELECTION", filed on May 18, 2018, the disclosures and contents of which are hereby incorporated by reference in their entireties.

TECHNICAL FIELD

The present disclosure generally relates to the provision of services in a telecommunications system, and more specifically to the provision of services in a Service Based Architecture, SBA, telecommunications system, such as a Fifth Generation, 5G, telecommunications system.

BACKGROUND

The 5G telecommunications core network is an example of a Service Based Architecture, SBA, in which Network Functions, NF, provide one or multiple services to entities requiring telecommunications services from a particular NF. In turn, an NF may also request telecommunications services from another NF, for example.

The concept of provision of services between entities in a telecommunications system or telecommunications network is not limited to strictly service organised architectures. The service concept may be widely used in data communication and/or data exchange and/or data processing environments, wherein one or multiple service producers or service providers provide services for supporting data processing by one or multiple service consumers.

The provision of services enables a more flexible development of new services, as it becomes possible to connect to other components without introducing specific new interfaces, for example.

Services may create multiple service instances at a same or different locations when they are needed. At run time, a service instance is an instantiation in the execution environment, for example. The number of service instances may vary, among others due to in/out scaling, failures, programmed maintenance, etc. In the 5G SBA, for example, at present, available services, i.e. service providers, for identifying themselves to service consumers, may be registered in a Network or NF Repository Function, NRF, by providing the NF profile or NF service profile that includes information for one or multiple NF services, and one or multiple service instances for each NF service. The NF profile may be provided at registration of a service provider or service producer in an NRF or, alternatively, may be stored in the NRF at configuration thereof.

If a service producer registers multiple instances of a service, then the service consumer needs to select a respective service instance for executing a requested service. Such selection may be based on several criteria, such as balancing the load among available service instances, traffic demands, and others. In case the selected service instance is not available, for example due to a failure, the service consumer needs to select other instance(s) of that service, for example.

As the number of service instances generally will not be static, i.e. the number of service instances may vary over time, service instance selection may become rather complex. In particular, when the number of required service instances exceeds the maximum suitable number of service instances of a particular service. For capacity reasons, service instances of different service providers need to be registered and made available for selection by a service consumer. For making a proper service instance selection, from a consumer perspective, any service instance of any service provider should have the same functional view. That is, the service consumer may select a different service provider instance, and then it should get a coherent behaviour, that is, a same behaviour as if the same or previous service provider instance was used.

Service instances, as a result of their execution, may store a particular data context or state, which is stored in a so-called state repository. When selecting another instance of a requested service, for example due to failure of a current service instance, data context or state consistency has to be ensured. Accordingly, the selection should prioritize that the data context (state) is not lost. However, the service consumer does not have any information to know whether respective service instances do share a same state repository.

As mentioned previously, services may create multiple service instances at different or same locations. Hence, service instances may be created at different geographical locations. For geographical redundancy, also abbreviated as geored, reasons it may even be required that service instances are created in different locations. For example, for a same service, instances may be required in Data Centers separated at a particular distance which, for security and reliability reasons, is considered appropriate in case of disasters, or may be required to be created in different regions.

The service consumer needs to be able to select, as much as possible, service instances from the zone or area where the service consumer is located, or closest to its location, unless failures, critical load congestion, etc. This to minimize network resources and signalling latency, for example.

Accordingly, there is a need for a solution for a service consumer to request service from a proper service instance, among others while taking into account service instance failures, service instance overload protection, traffic demands, geographical redundancy, and ensuring data consistency.

SUMMARY

In a first aspect, there is provided a method of operating a service discovery and selection function in a telecommunications system, the method comprising the steps of:
  registering, with the service discovery and selection function, a service profile of a service provided by at least one service producer, the service profile among others comprising consistency group information and proximity information, wherein the consistency group information identifies instances of the service sharing a same state and the proximity information identifying deployment of the service instances;
  selecting, by the service discovery and selection function, from the service profile, a single service instance of the service for a service consumer requesting the service, based on service selection criteria accessible to the service discovery and selection function, and
  identifying, by the service discovery and selection function, the selected service instance to the service consumer.

According to the method of the present disclosure, each service provider registers itself by the service discovery and selection function with a service profile that identifies instances of a particular service sharing a same state and information identifying deployment of these service instances in the telecommunications system. This consistency group information and proximity information, among other information, is part of the service profile of a particular service registered with the service discovery and selection function. In this way, a service producer or service providers makes itself 'visible' to potential service consumers.

The service consumer, when requesting a particular service, is now provided by the service discovery and selection function with one single service instance from a profile of a requested service registered with the service discovery and selection function, which service instance is selected in a selection process based on previously stored service selection criteria. These service selection criteria include service selection criteria pertaining to a particular service consumer, such as geographic information, and other non-functional service instance requirements pertaining to service instance selection taking account of load distribution and overload protection, scaling in/out based on traffic demands, ensuring data consistency in case of failures and geo redundancy, as well as potentially other deployment or robustness service instance selection requirements.

In the context of the present disclosure, providing the single service instance to the service consumer may include providing an identification from which the service consumer is able to retrieve the selected service instance with the respective service provider, or may include that a complete service instance profile information is provided to the service consumer for accessing the selected service instance.

Hence, with the method according to the present disclosure, the need for a service consumer to be aware of such non-functional service instance requirements is effectively avoided, and thereby the need for implementing rather complex additional functionality or logic with a service consumer, to be able to handle the selection of the most appropriate service instance.

The service selection criteria may be stored and updated by a service consumer itself or by an authorized operations and maintenance center, O&M, entity or otherwise.

With the present solution, the service discovery and selection function implements the service logic to configure/update service instance selection criteria and to be able to select the most suitable service instance. This service logic may be dynamically updated or amended without impacting the service consumer. This logic is common for all the services (both consumer and providers), and simplifies development of services and the deployments thereof.

Hence, service profile changes pertaining to a registered service profile from a service producer and service profile changes pertaining to a selected service instance to the service consumer may be handled by the service discovery and selection function.

In an embodiment of the present disclosure, the consistency group information comprises a plurality of consistency groups and a respective consistency group identifies all instances of a service or different services sharing a same state. As service instances in a same consistency group share a same data context or state, a service consumer may require or subscribe to a particular consistency group for selecting a service instance in case of failure of a currently selected service instance, for example. Hence ensuring data context or state consistency.

In a further embodiment, the proximity information identifies where the service instances are deployed in the telecommunications system, allowing to select the service instance based on at least one of geographical distance of the service producer or service provider and the service consumer, for optimizing network resources and signalling latency, for example.

In the context of the 5G SBA, for example, proximity levels of a respective service instance, among others, may comprise a Data Center level, a Region level and a GeoArea level.

The data context or state information of a respective service instance may be stored at a state repository accessible to the service discovery and selection function.

In an embodiment of the method according to the present disclosure, the service discovery and selection function comprises a management entity, a discovery entity, and a service instance selection entity, the registering is performed at the management entity, requesting the service by a service consumer and identifying the selected service instance to the service consumer is performed at the discovery entity, and selecting a service instance is performed at the service instance selection entity.

The service instance selection entity may be performed as part of the discovery entity, for example.

With this embodiment, the method according to the present disclosure can be easily implemented, in an already proposed Network Repository Function, NRF, of a 5G SBA, by adding the service instance selection entity and by a slight modification of the management entity and the discovery entity. However, the method according to the present disclosure can also be implemented as a function that is completely or partly independent from the NRF.

In a further embodiment, the service profile and the service selection criteria are stored at the management entity, wherein the service instance selection entity accesses the management entity for selecting the service instance.

The person skilled in the art will appreciate that the respective entities may be provided or implemented as a respective service or service function in a telecommunications system.

In another embodiment of the method according to the present disclosure, wherein the service discovery and selection function comprises a registration entity, a discovery entity, and a service instance selection entity, having access to a unified data repository, UDR, of the telecommunications system, wherein the UDR stores service profiles and service selection criteria, the registering is performed at the registration entity storing the service profile at the UDR, requesting the service by a service consumer and identifying the selected service instance to the service consumer is performed at the discovery entity, and selecting a service instance is performed at the service instance selection entity by accessing the service profile and service selection criteria stored at the UDR.

As access to the UDR may be standardized, multi-vendor independency of the service discovery and selection function entities or services can be achieved by the present disclosure, by storing data context or state information of service instances at the UDR.

This makes all the necessary data for service provisioning independently accessible to potential service providers and service consumers, and may provide added value.

In a second aspect of the present disclosure, there is provided a service discovery and selection function device arranged for operating in a telecommunications system, the service discovery and selection function device comprising:
  a registering module, arranged for registering a service profile of a service provided by at least one service producer of the telecommunications system, the service profile among others comprising consistency group information and proximity information, wherein the consistency group information identifies instances of the service sharing a same state and the proximity information identifying deployment of the service instances in the telecommunications system;

a selecting module, arranged for selecting, from the service profile, a single service instance of the service for a service consumer of the telecommunications system requesting the service, based on service selection criteria accessible to the service discovery and selection function, and a discovery module, arranged for identifying, by the service discovery and selection function, the selected service instance to the service consumer.

It will be appreciated that the entities and modules disclosed may be implemented as separate hardware and/or software modules and entities, and controlled by or executed in a processor or the like.

In a third aspect of the present disclosure, a computer program product is provided, comprising a computer readable storage medium, having instructions which, when executed on at least one processor, cause the at least one processor to carry out the method according to a respective one of the first and second aspect of the present disclosure.

In the context of the present disclosure, the service producer and the service consumer are any one of a service provided by the telecommunications system, a Network Function, NF, of the telecommunications system, a server operating with the telecommunications system, and a node operating in the telecommunications system.

The above-mentioned and other features and advantages of the disclosure will be best understood from the following description referring to the attached drawings disclosing, by way of example and not as a limitation, an implementation of the service discovery and selection function in accordance with the present disclosure in a present 5G SBA NRF. In the drawings, like reference numerals denote identical parts or parts performing an identical or comparable function or operation.

DETAILED DESCRIPTION

Figure 1:
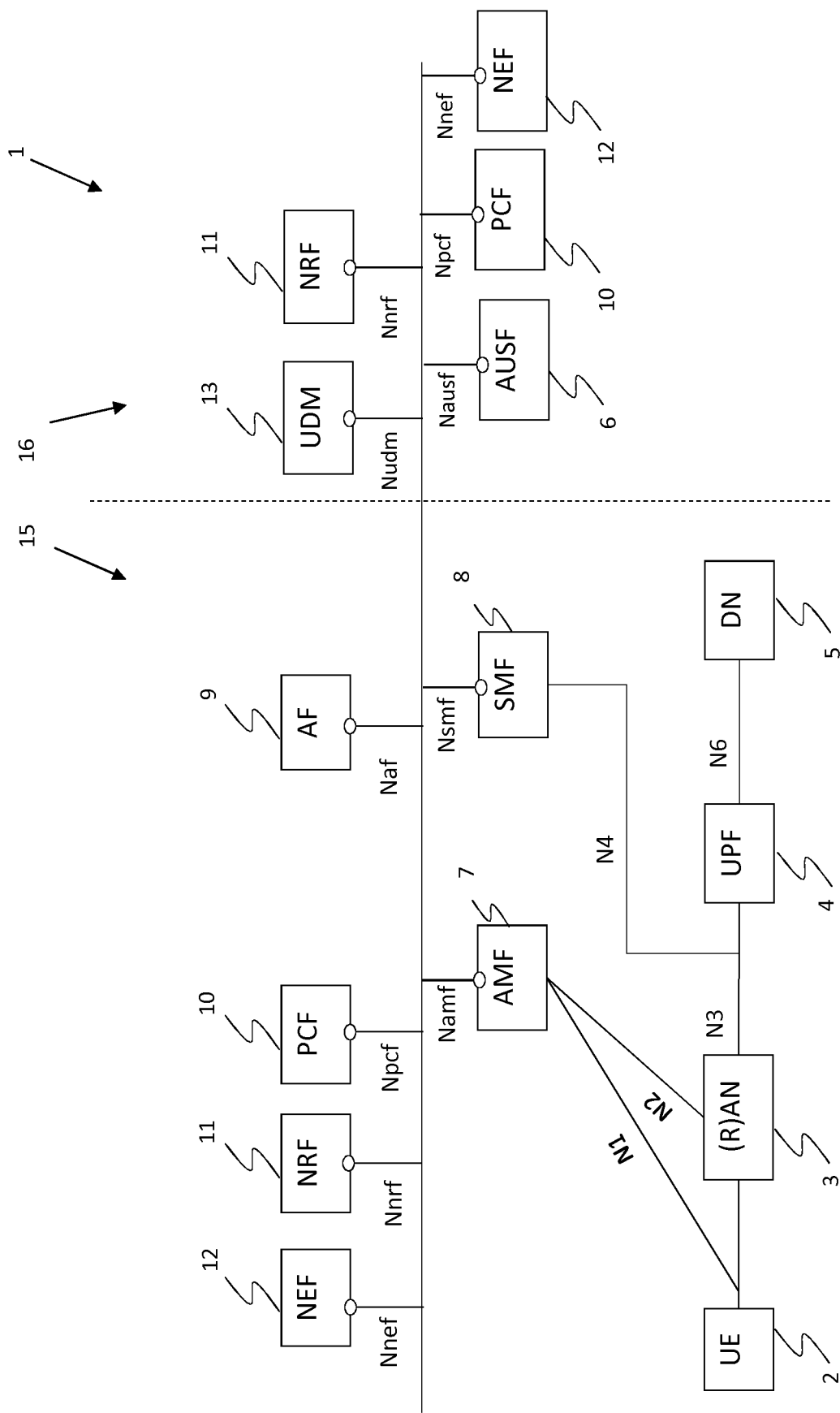
FIG. 1 schematically illustrates part of the architecture of a fifth generation, 5G, telecommunication network, according to the prior art.

FIG. 1 schematically illustrates part of the reference architecture 1 of a fifth generation, 5G, Service Based Architecture, SBA, telecommunication network system, according to the prior art. The 5G system architecture comprises the following Network Functions, NFs:

Authentication Server Function, AUSF, 6
Access and Mobility Management Function, AMF, 7
Data network, DN, e.g. operator services, Internet access or 3rd party services, 5
Network Exposure Function, NEF, 12
NF Repository Function, NRF, 11
Policy Control Function, PCF, 10
Session Management Function, SMF, 8
Unified Data Management, UDM, 13
User Plane Function, UPF, 4
Application Function, AF, 9
User Equipment, UE, 2
(Radio) Access Network, (R)AN, 3.

A functional description of these network functions is specified in clause 6 of the 3GPP standard 23.501, "System Architecture for the 5G system", the contents of which are included herein, by reference. Specifically, in FIG. 1, reference numeral 1 indicates the system architecture for a 5G telecommunication network when in a roaming case. That is, the UE 2 is not operating in the home telecommunication network where it originally belongs to, i.e. is registered. In the embodiment shown, it is assumed that the UE 2 is originally registered with a home network 16, but is presently located in a visited network 15. Such a representation is shown merely for illustrative purposes and is not a limitation of the teachings according to the present disclosure.

Figure 2:
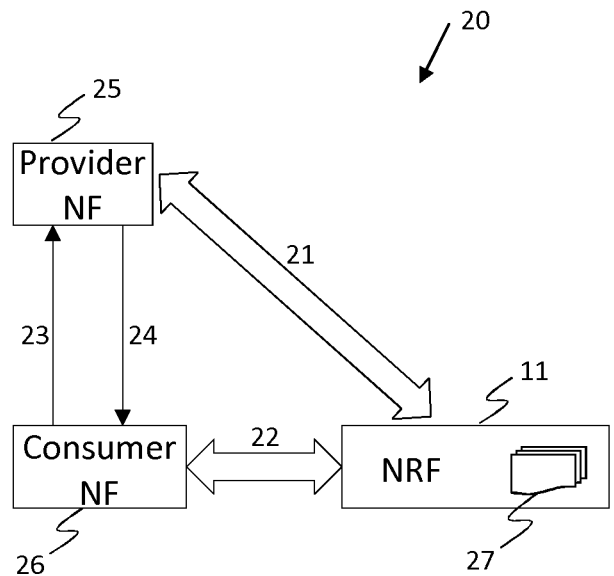
FIG. 2 schematically illustrates a service registration and discovery procedure in a service based architecture telecommunication network, according to the prior art.

FIG. 2 schematically illustrates a prior art service registration and discovery procedure in a the 5G SBA system shown in FIG. 1. A service producer or service provider NF 25, during registration 21, provides/updates an NF service profile 27 that includes one or multiple NF services, and one or multiple instances of each NF service. The NF profile 27 is to be maintained at the NRF 11 and may include the following information:

NF instance identifier, ID
NF type
Public Land Mobile Network, PLMN, ID
Network Slice related Identifier(s) e.g. S-NSSAI, NSI ID
Fully Qualified Domain Name, FQDN, or Internet Protocol, IP, address of NF
NF capacity information
NF Specific Service authorization information
Names of supported services
Endpoint information of instance(s) of each supported service
Identification of stored data/information In subsequent step 22, a service consumer NF 26 queries the NRF 11 for available services and available service providers. After receiving a response from the NRF 11, the service consumer NF 26 requests a service instance of a particular service from the service provider 25, indicated by reference numeral 23. Subsequently a response 24 to the service request 23 is received by the service consumer NF 26 from the service provider 25, and the service consumer 26 may start to use, i.e. consume, the requested service, i.e. service instance, from the service provider 25.

In some service deployments/distributions not all service instances of a same service will share the same context data or state information. In the event that a service consumer 26 needs to select an alternative service instance, for example in the case of a service instance failure, context data or state consistency has to be ensured. In other words, selection of an alternative service instance should prioritize that the data context or state information will not be lost.

Figure 3:
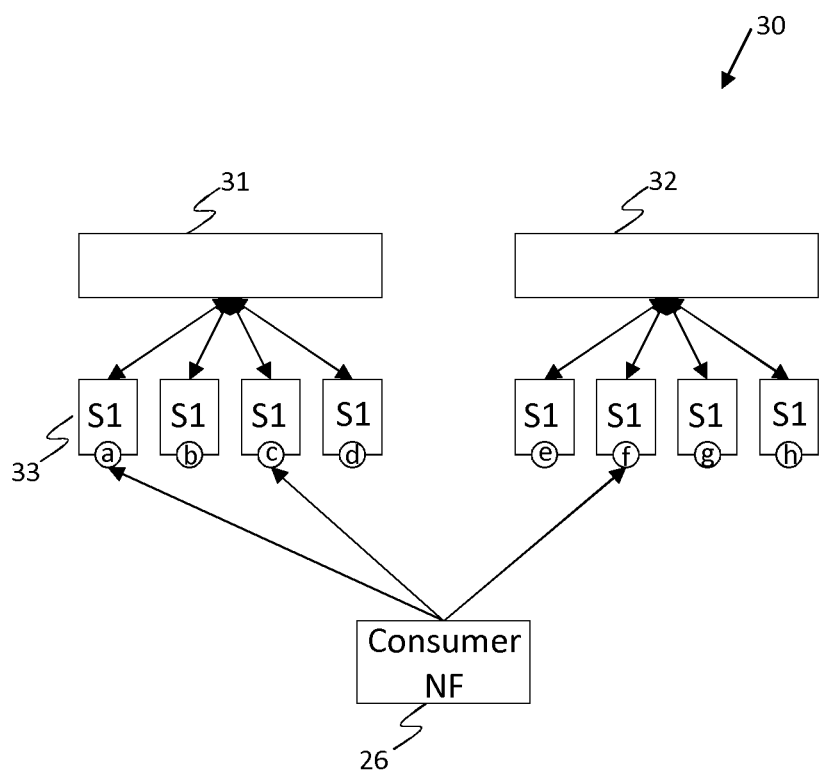
FIG. 3 schematically illustrates two different service instance pools with respect to state maintenance, according to the prior art.

FIG. 3 schematically illustrates two different service instance pools with respect to service context data or state information of a single service 1, S1, 33. Instances a, b, c and d of S1 share a same state repository 31. This means that if any one of the service instances a, b, c, d fails, another service instance sharing the particular state repository 31 of this pool may be selected, and this service instance will be able to recover the last state.

However, the S1 instances e, f, g, h do not share the state repository 31. Instead, they share a different state repository 32. In such a situation, the consumer 26 should be aware of this difference when selecting another service instance in case of failures, for example, as the service instances a-d of S1 33 and e-h may not relate to the same data context or state information.

Figure 4:
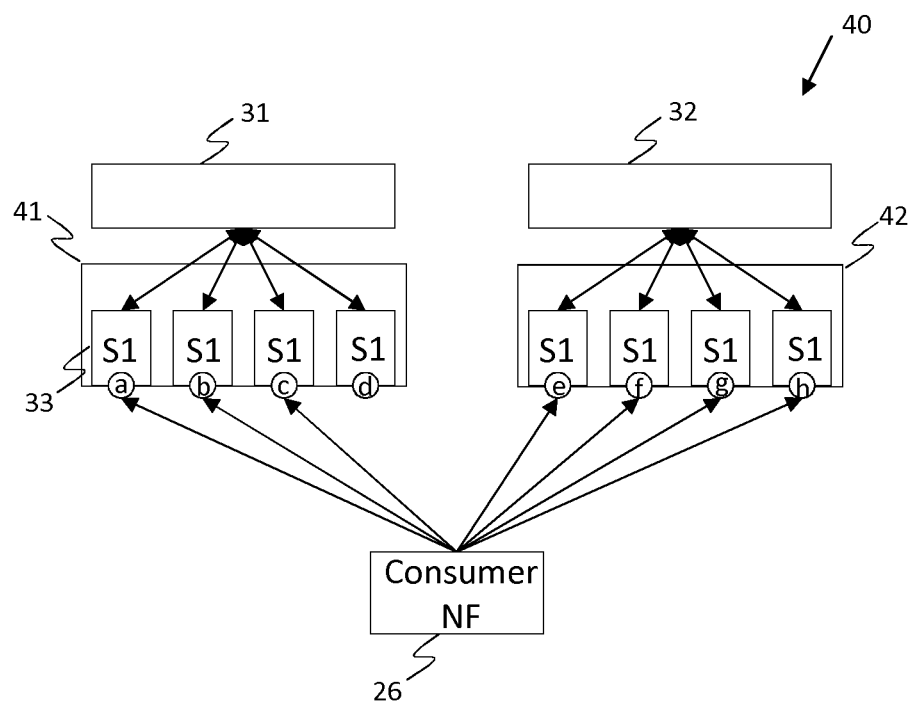
FIG. 4 schematically illustrates two different network functions with service instance pools, according to the prior art.

FIG. 4 schematically illustrates a system 40 with two different network functions and different service instance pools. Alternative to the system 30 presented in FIG. 3, service instances a-h of S1 33 may also be registered with two different NFs 41 and 42 respectively. This may result from scaling in/out based on traffic demands in the network. In such a scenario, the number of instances will also not be static and will vary over time. Again, in case of a failure, the service consumer NF 26 needs to be aware of this service scenario, to select the most appropriate service instance.

Figure 5:
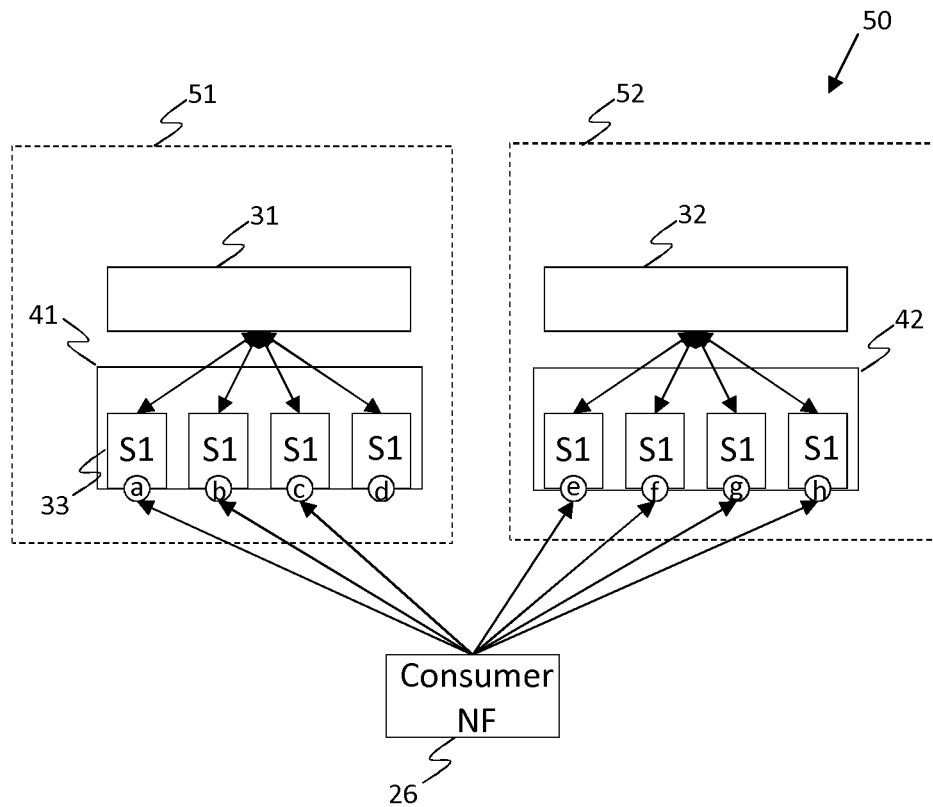
FIG. 5 schematically illustrates two different network functions with service instance pools in two different geographical areas, according to the prior art.

FIG. 5 schematically illustrates two different network functions with service instance pools in two different geographical areas 51, 52. The system as illustrated in FIG. 4 by reference numeral 40 may be spread over one or more geographical areas. In FIG. 5, the two network functions 41, 42 are located in different geographical zones 51, 52, respectively. In some solutions, it is mandatory to ensure geographical redundancy. In some solutions, the service consumer NF 26 needs to be able, wherever possible, to select a function in the same zone where it is located. If such a selection is not possible, it may select a service instance from the network function closest to this location, unless there are other criteria, such as failure of original zone, critical load congestion, to select a different zone. Hence, the service consumer NF 26 needs to have knowledge about the deployment of service instances in the SBA.

Although only a local state repository is shown in the examples, the skilled person will appreciate that state repository may also be centralized.

Accordingly, in the prior art solutions presented above, in order to be able to select a most suitable service instance from a service provider by a service consumer, the latter needs to be provided with rather complex additional functionality or logic operating on service selection criteria such as geographic information and other non-functional service instance requirements pertaining to service instance selection, for taking account of load distribution and overload protection of service instances, scaling in/out based on traffic demands, ensuring service instance data consistency in case of failures, as well as possible other (future) deployment or robustness service instance selection requirements.

Figure 6:
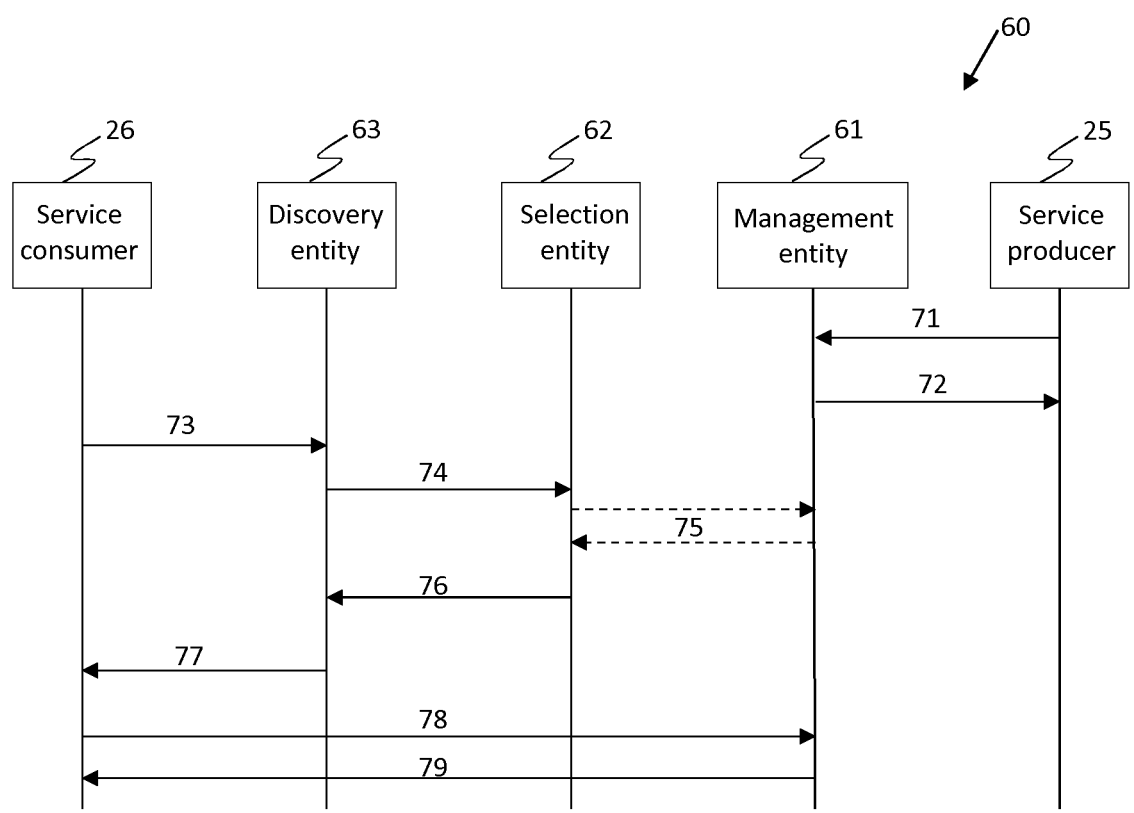
FIG. 6 schematically illustrates an implementation of a method according to the present disclosure.

FIG. 6 schematically illustrates an implementation of an embodiment 60 of the method according to the present disclosure in an NRF 11 of a 5G SBA 1, comprising an NRF management entity or service, i.e. Nnrf_NFManagement service 61, and an NRF discovery entity or service, i.e. Nnrf_NFDiscovery service 63.

The Nnrf_NFManagement service 61 registers a service producer or service provider NF 25 with the NRF 11, by providing the service profile of the service producer NF 26 to the NRF 11, and the NRF 11 marks the service producer NF 25 as being available.

The Nnrf_NFDiscovery service 63 enables a service consumer NF 26 to discover a set of NF service instances of a specific NF service or a target NF type. The Nnrf_NFDiscovery service 63 may also enables an NF service to discover another specific NF service.

Table 1 below provides an overview of present service definitions according to the 5G SBA standard provisions. The service operations mentioned in table 1 allow an NF or NF services to communicate with the NRF 11.

TABLE 1

| Service Name | Service Operations | Operation Semantics | Example Service Consumer(s) |
|---|---|---|---|
| Nnrf_NFManagement | NFRegister | Request/Response | AMF, SMF, UDM, AUSF, NEF, PCF, SMSF, NSSF |
| | NFUpdate | Request/Response | AMF, SMF, UDM, AUSF, NEF, PCF, SMSF, NSSF |
| | NFDeregister | Request/Response | AMF, SMF, UDM, AUSF, NEF, PCF, SMSF, NSSF |
| | NFStatus-Subscribe | Subscribe/Notify | AMF, SMF, PCF, NEF, NSSF, SMSF, AUSF |
| | NFStatusNotify | | AMF, SMF, PCF, NEF, NSSF, SMSF, AUSF |
| | NFStatus-UnSubscribe | | AMF, SMF, PCF, NEF, NSSF, SMSF, AUSF |
| Nnrf_NFDiscovery | Request | Request/Response | AMF, SMF, PCF, NEF, NSSF, SMSF, AUSF |

In addition to these known NRF services, the present disclosure proposes a new service, i.e. a service instance selection entity or service, Nnrf_NFInstanceSelector, 62. This proposed Nnrf_NFInstanceSelector 62 may be modelled as a separate Third Generation Partnership Project, 3GPP, SBA service or it may also be provided as a part of the already existing Nnrf_NFDiscovery 63 service. The newly proposed Nnrf_NFInstanceSelector 62 may have the following service operations as shown in table 2 below.

TABLE 2

| Service Name | Service Operations | Operation Semantics |
|---|---|---|
| Nnrf_NFInstanceSelector | Select | Request/Response |
| | Update | Request/Response |

According to the embodiment 60, the service producer 25 registers 71 its service instances with the Nnrf_NFManagement 61. This may be done by an existing Nnrf_NFManagement Register operation, however the data provided comprises additional information, according to the present disclosure as part of the Service profile, i.e.:

Consistency Group information: this identifies services instances of respective services, regardless whether they are defined within the same NF or a Virtual NF, VNF, that share the same state.

Proximity information: this identifies where the service instances are deployed in the SBA. At least the following proximity levels may be identified: Data Center, Region, GeoArea.

The service producer or service provider 25 receives a confirmation or an acknowledgement 72 of the registration 71 from the Nnrf_NFManagement 61. When a service consumer 26 wants to consume a service provided by the service provider 25, then it needs to discover 73, through the Nnrf_NFDiscovery 63, an instance of the service provided by the service producer 25. The present disclosure proposes, in response to such a service request, to always provide a single instance of the service provider 25.

To this end, the Nnrf_NFDiscovery 63 requests 74 with the Nnrf_NFInstanceSelector 62 to provide the most suitable service instance, according to previously stored service selection criteria. These service selection criteria include service selection criteria pertaining to a particular service consumer 26, such as geographic information, and other non-functional service instance requirements pertaining to service instance selection taking account of load distribution and overload protection, scaling in/out based on traffic demands, ensuring data consistency in case of failures and geo redundancy, as well as potentially other deployment or robustness service instance selection requirements.

Nnrf_NFInstanceSelector 62 may retrieve 75 all service producer 25 instance service profiles of a requested service, that include values meeting the selection criteria, and selects the most appropriate service instance.

In a subsequent step 76, the Nnrf_NFInstanceSelector 62 provides an identification of the selected service producer 25 instance to Nnrf_NFDiscovery 63 for communicating 77 to the service consumer 26. As an alternative, the Nnrf_NFInstanceSelector 62 may provide the entire service instance profile, thereby avoiding additional overhead signalling. Then, the Nnrf_NFDiscovery 63 receives the selected service instance profile for communicating to the service consumer 26.

In further steps 78, 79, the service consumer 26 may subscribe to changes in the service instances profile of the service producer 25.

Figure 7:
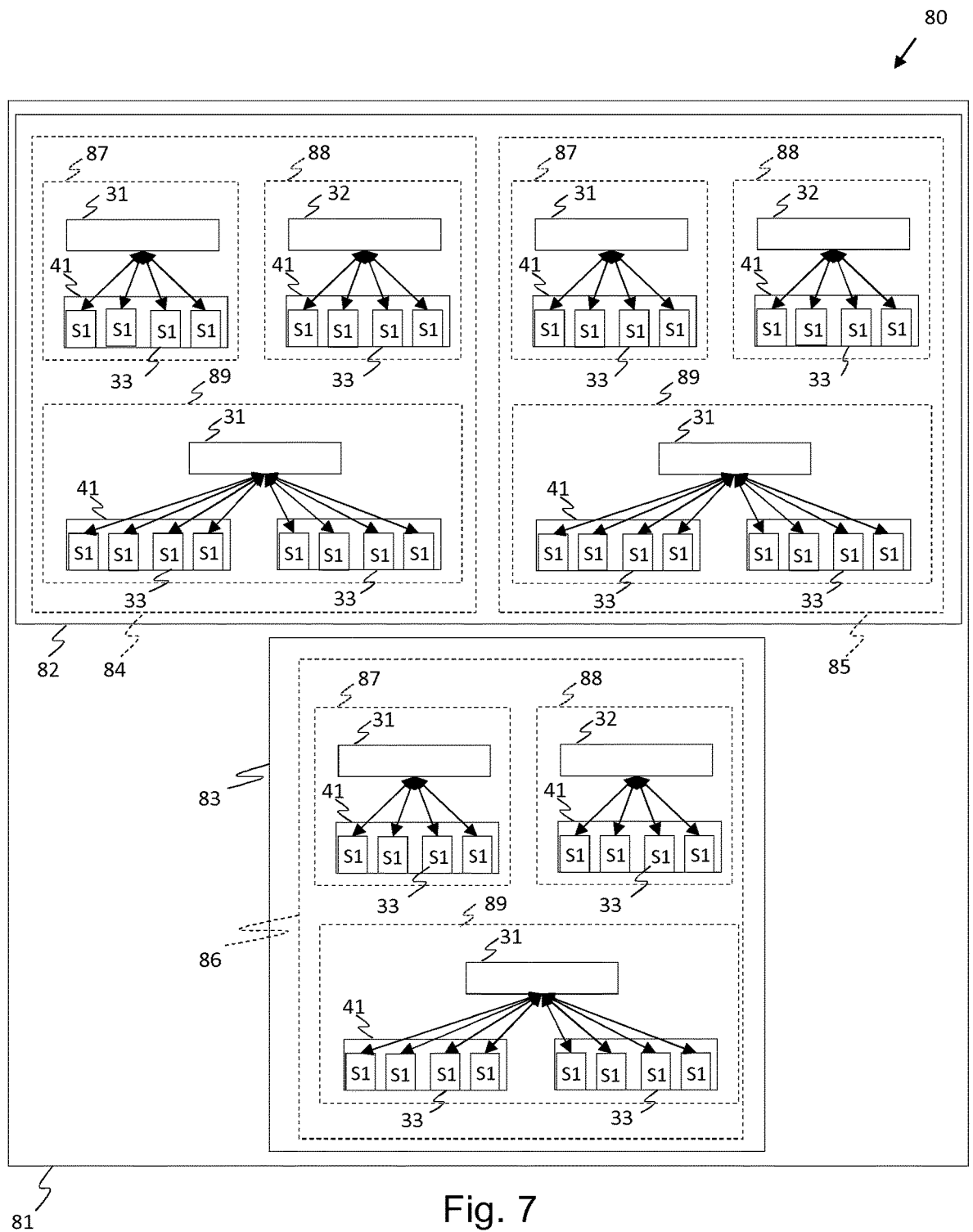
FIG. 7 schematically illustrates consistency groups and proximity levels, according to the present disclosure.

FIG. 7 schematically illustrates consistency groups and proximity levels. Consistency groups 87, 88, 89 identify all the service instances 33, regardless whether they are defined within a same NF, that share the same state, and are able to recover in case of failure, for example, using a stored state in a shared state repository 31, 32. Proximity levels identify where the service instances are deployed. At least data centre 84, 85, 86, or region 82, 83 or geographical area 81 proximity levels are identified.

Providing that the consistency groups not only group one or several instances of the same service, but also apply to instances of different services, allows services that in fact share some data among then. If the services are always defined within the same consistency group, ensures that both services can access the shared data. An example of two dependent services in 5G SBA is, for example, Npcf_PolicyAuthorization and Npcf_SMPolicyControl.

Where are kept within the same Data Context, DC, is an example. There are options where the same data could be replicated between different DCs, this means that the consistency groups may be extended. This may result in two types of consistency groups (or values): async and sync, for example.

Figure 8:
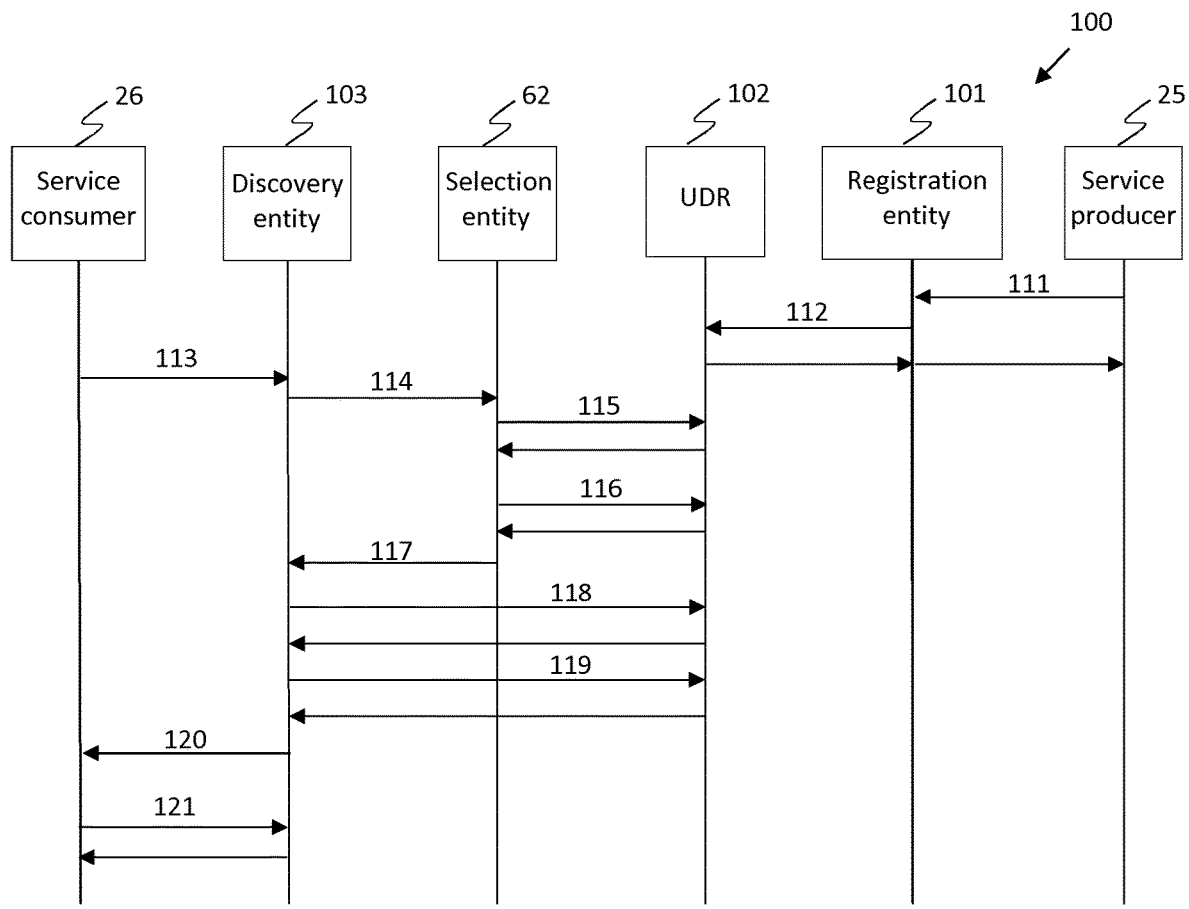
FIG. 8 schematically illustrates an implementation of a method according to the present disclosure.

FIG. 8 schematically illustrates an implementation 100 of a further embodiment of the method according to the present disclosure. In the method illustrated by reference numeral 100, instead of using existing Nnrf_NFManagement 61 and Nnrf_NFDiscovery 63 services, it is proposed to define new services as follows:

a) Nnrf_NFRegistration 101, employing only Request/Response operations. The subscribe/notify operations are offered by Nnrf_NFDiscovery 103.

b) Nnrf_NFDiscovery 103 also includes subscribe/Notify operations in order to subscribe to changes in the service profile of a service producer 25.

c) Nnrf_NFInstanceSelector 62 has similar functions as described previously.

An overview of the functions of the proposed NRF are provided in table 3 below.

| Service Name | Service Operations | Operation Semantics |
| --- | --- | --- |
| Nnrf_NFRegistration | Register | Request/Response |
|  | Update | Request/Response |
|  | Deregister | Request/Response |
| Nnrf_NFDiscovery | Request | Request/Response |
|  | ProfileSubscribe | Subscribe/Notify |
|  | ProfileNotify |  |
|  | ProfileUnSubscribe |  |
| Nnrf_NFInstanceSelector | Select | Request/Response |
|  | Update | Request/Response |

Step 111 in FIG. 8 is similar to step 71 as explained in reference with FIG. 6. The Nnrf_NFRegistration service 101 needs to store service profile information in a permanent storage. It is proposed in this disclosure to store this information in the Unified Data Repository, UDR, 102 of the SBA in the form of new information that could be accessible by other consumers. In fact, this is a possible way to solve a multivendor issue when the services are not bundled with an NF, since the information that is required to be stored by Nnrf_NFRegistration 101 is the one expected to be read by Nnrf_NFDiscovery 103 in steps 113/114. This will be possible only if both services are bundled into the same NF and both are from the same vendor, since the data to be stored is not standardized.

The UDR 102 may be part of the UDM 13 in a 5G SBA, for example. By storing service profile information in the UDR 102, and standardize its access, then both the registration and discovery services become independent, and the stored data will be as well accessible by other potential consumers, i.e. providing for a multi-vendor solution.

Steps 113, 114 in FIG. 8 are similar to steps 73, 74 explained in connection with FIG. 6, and are not further elaborated here. In steps 115, 116, the Nnrf_NFInstanceSelector 62 gets from the UDR 102 all service producer 25 instance service profiles that include values for respective selection criteria, like consistency data and proximity level, and it gets selection criteria information and priority information applicable for a service consumer 26 to select a relevant service producer 25.

Based on this information, Nnrf_NFInstanceSelector 62 finds the corresponding service producer 25 service instance. The step 117 is similar to step 76 in that the Nnrf_NFInstanceSelector 62 provides an identification of the service producer 25 service instance to Nnrf_NFDiscovery 103. In a further step 118, the Nnrf_NFDiscovery 103 gets a selected service instance profile from the UDR 102. Subsequently, the Nnrf_NFDiscovery 103 subscribes 119 to receive a notification from the UDR 102 when there are changes to selected service instance profile.

In the step 120, the Nnrf_NFdiscovery 103 provides the service consumer 26 with the required information from the selected service producer 25 instance profile. The service consumer 26 again may subscribe 121 to changes in service producer 25 instance profile information.

The proposal according to the present embodiment also requires that information in UDR 102 is updated. The following information may need to be updated:

a) Available service provider instances:

Service profiles are updated into UDR 102, by registration of new instances, update of profile of registered instances, and deregistration of instances that are no longer providing service.

b) Service consumer selection criteria:

For each service consumer 26, the selection criteria such as the consistency group and proximity level, as well as a priority among other factors that may be different for each service provider have to be configured in the UDR 102, by using Nnrf_NFInstanceSelector 62. Selection criteria could as well be updated/configured by an authorized Operations and Maintenance, O&M, entity (not shown in figure), either directly in the UDR 102, or by using Nnrf_NFInstanceSelector 62 service.

Figure 9:
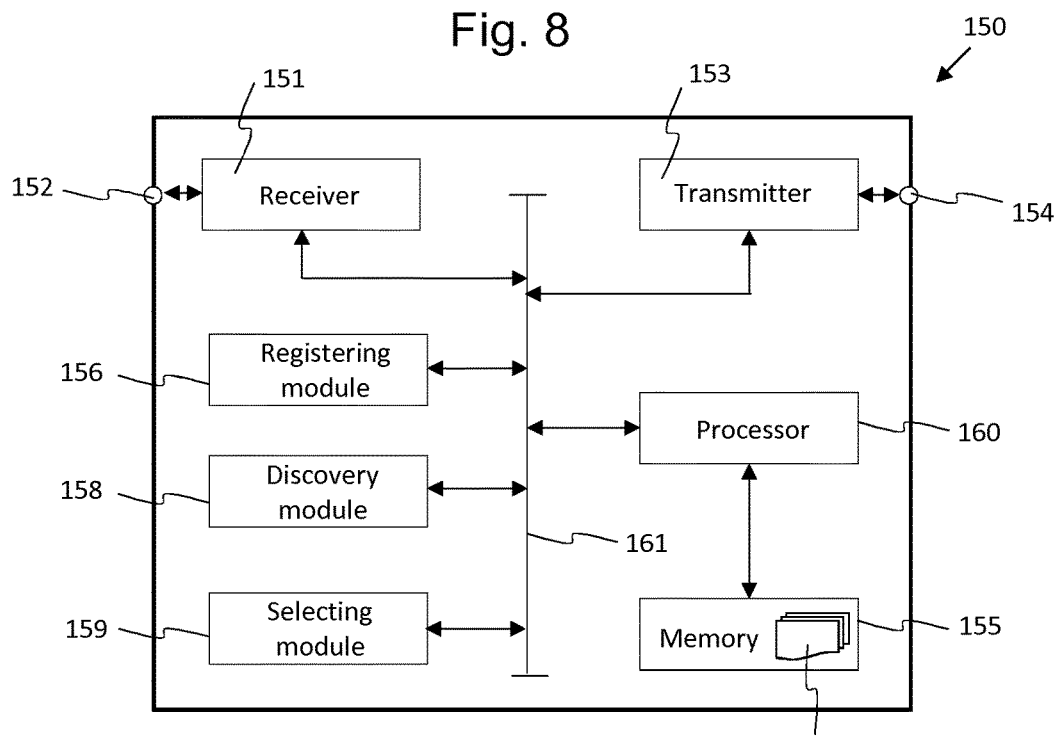
FIG. 9 schematically illustrates an example of a service discovery and selection function device according to the present disclosure.

FIG. 9 schematically illustrates an example of a service discovery and selection function device 150 according to the present disclosure, for operating in a telecommunications environment, such as a 5G SBA shown in FIG. 1, for example. The device 150 comprises a receiver module 151, having an input 152 and a transmitter module 153, having an output 154. The receiver and transmitter modules 151, 153 are arranged for exchanging service related data between the NRF 150 and service producers or service providers, service consumers and an O&M entity or center, and a UDR, such as service profile information data, service selection criteria data and other data required for communication purposes.

The receiver and transmitter modules 151, 53 may be arranged for operating in accordance with HyperText Transfer Protocol/REpresentational State Transfer, HTTP/REST, data transfer technology, over the control plane in an SBA network, for example. Those skilled in the art will appreciate that the receiver and transmitter modules 151, 153 may be implemented as a single transceiver module, for example.

The device 150 comprises a memory or storage 155, a registering module 156, arranged for operating as management entity or registration entity, for example, and arranged for registering a service profile 157 of a service and service instances provided by at least one service producer, such as an NF operating in an SBA. The service profile 157, among others, comprises consistency group information and proximity information of service instances of a service, in accordance with the present disclosure.

The device 150 further comprises a discovery module 158, arranged for operating as discovery entity, for example, for receiving a service request of a service consumer and identifying a single selected service instance to the service consumer. Service instances are selected by a selecting module 159 of the device 150, arranged for operating as service instance selection entity, for example, for selecting, from the service profile 157 of a requested service, a single service instance for a service consumer, based on service selection criteria for selecting service instances registered with the device 150, which selection criteria may be stored, for example, in the memory or storage 156.

The storage or memory 156 may further store context data or state information pertaining to a particular service instance, for example, and other intermediate data values and/or a computer program product which when executed by a processor 160 causes the device 150 to perform a method according to an aspect of the present disclosure. All the internal components of the device 150 communicate with one another using an internal data bus 161.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment.

The invention claimed is:

1. A method of operating a service discovery and selection function in a telecommunications system, said method comprising the steps of:

registering, with said service discovery and selection function, a service profile of a service provided by at least one service producer, said service profile among others comprising consistency group information and proximity information, wherein said consistency group information identifies instances of said service sharing a same state and stored in a shared state repository and said proximity information identifying deployment of said service instances;

selecting, by said service discovery and selection function, from said service profile, a single service instance of said service for a service consumer requesting said service, based on service selection criteria accessible to said service discovery and selection function;

identifying, by said service discovery and selection function, said selected service instance to said service consumer, and subscribing, by said service discovery and selection function, to receive a notification from a unified data repository (UDR) when there are changes to said selected service instance profile, wherein said proximity information identifies proximity levels of a respective service instance by allowing to select said service instance based on geographical distance of the at least one service producer or a service provider and the service consumer, for optimizing network resources and signalling latency.

2. The method according to claim 1, wherein said consistency group information comprises a plurality of consistency groups and a respective consistency group identifies all instances of a service or different services sharing a same state and stored in a shared state repository.

3. The method according to claim 1, wherein state information of a respective service instance is stored at a state repository accessible to said service discovery and selection function.

4. The method according to claim 1, wherein said service discovery and selection function comprises a management entity, a discovery entity, and a service instance selection entity, wherein said registering is performed at said management entity, requesting said service by a service consumer and identifying said selected service instance to said service consumer is performed at said discovery entity, and selecting a service instance is performed at said service instance selection entity.

5. The method according to claim 4, wherein said service profile and said service selection criteria are stored at said management entity, wherein said service instance selection entity accesses said management entity for selecting said service instance.

6. The method according to claim 4, wherein said service profile is stored at said management entity and said service selection criteria are stored at said service instance selection entity, wherein said service instance selection entity accesses said management entity for selecting said service instance.

7. The method according claim 1, wherein said service discovery and selection function comprises a registration entity, a discovery entity, and a service instance selection entity, having access to said unified data repository (UDR) of said telecommunication, wherein said UDR storing service profiles and service selection criteria, said registering is performed at said registration entity storing said service profile at said UDR, requesting said service by a service consumer and identifying said selected service instance to said service consumer is performed at said discovery entity, and selecting a service instance is performed at said service instance selection entity by accessing said service profile and service selection criteria stored at said UDR.

8. The method according to claim 7, wherein state information of a respective service instance is stored at said UDR.

9. The method according to claim 4, wherein said service instance selection entity is performed as part of said discovery entity.

10. The method according to claim 4, wherein any of said management entity, discovery entity, service instance selection entity and registration entity are performed as a service by said service discovery and selection function.

11. The method according to claim 1, wherein said service discovery and selection function registers service profile changes pertaining to a registered service profile from a service producer.

12. The method according to claim 1, wherein said service discovery and selection function provides service profile changes pertaining to a selected service instance to said service consumer.

13. The method according to claim 1, wherein said service producer and said service consumer are any one of a service provided by said telecommunications system, a Network Function (NF) of said telecommunications system, a server operating with said telecommunications system, and a node operating in said telecommunications system.

14. A service discovery and selection function device, arranged for operating in a telecommunications system, said service discovery and selection function device comprising:

a registering processor, arranged for registering a service profile of a service provided by at least one service producer of said telecommunications system, said service profile among others comprising consistency group information and proximity information, wherein said consistency group information identifies instances of said service sharing a same state and stored in a shared state repository and said proximity information identifying deployment of said service instances in said telecommunications system; a selecting processor, arranged for selecting, from said service profile, a single service instance of said service for a service consumer of said telecommunications system requesting said service, based on service selection criteria accessible to said service discovery and selection function;

a discovery processor, arranged for identifying, by said service discovery and selection function, said selected service instance to said service consumer, and subscribing to receive a notification from a unified data repository (UDR) when there are changes to said selected service instance profile, wherein said proximity information identifies proximity levels of a respective service instance by allowing to select said service instance based on geographical distance of the at least one service producer or a service provider and the service consumer, for optimizing network resources and signalling latency.

15. A computer program product, comprising a non-transitory computer readable storage medium storing instructions which, when executed on at least one processor, cause the at least one processor to carry out the method according to claim 1.

* * * * *